Figure 1:
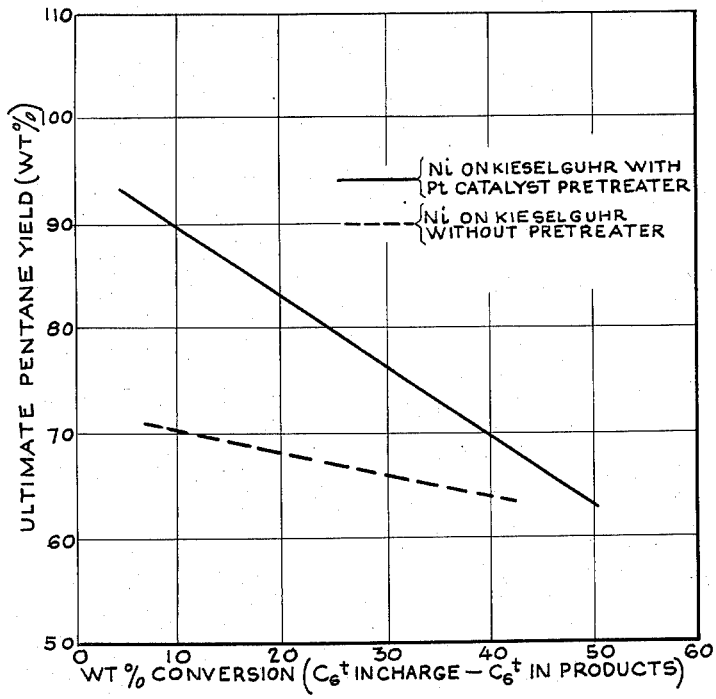

INVENTOR
George W. Munns, Jr.

United States Patent Office 2,970,954
Patented Feb. 7, 1961

2,970,954
SELECTIVE DEMETHYLATION OF HYDROCARBON MIXTURES CONTAINING SATURATED AND UNSATURATED HYDROCARBONS

George W. Munns, Jr., West Deptford Township, Gloucester County, N.J., assignor to Socony Mobil Oil Company, Inc., a corporation of New York Filed Feb. 14, 1958, Ser. No. 715,448

10 Claims. (Cl. 208—57)

This invention relates to the selective demethylation of a mixture of hydrocarbons consisting essentially of at least one demethylatable saturated hydrocarbon and at least one unsaturated hydrocarbon. More particularly, this invention is concerned with a catalytic process for reacting hydrogen with a hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one unsaturated hydrocarbon selected from aromatic and olefinic hydrocarbons, which process is carried out at closely correlated conditions of temperature and charge rate so that the principal desired reaction of the process is the replacement with hydrogen, and the scission of methyl groups to decrease the number of carbon atoms in one or more of the saturated hydrocarbon components of the charge mixture by at least one carbon atom.

It has heretofore been known to demethylate hydrocarbons including paraffins, alkyl hydroaromatics and alkyl aromatics in the presence of catalysts comprising nickel or cobalt and their oxides, either used as such or supported by carriers such as diatomaceous earth, alumina, silica, silica-alumina composites of either a synthetic or natural origin, crushed porcelain or some other refractory material which has substantially no adverse effect on the demethylation reaction.

Over catalysts of the above type, the desired demethylation is an exothermic reaction with a very high temperature co-efficient of reaction rate. Thus, once the reaction starts the heat produced acts to increase catalyst temperature which in turn, greatly accelerates reaction rate. The result is the formation in the body of catalyst of areas of excessively high temperature commonly referred to as "hot spots" at which subsequent demethylation of primary reaction products occurs leading to ultimate deactivation of the catalyst due to the extremely high temperatures encountered. Thus, the secondary reactions taking place being also demethylations, aggravate the hot spot formation. The net result is a strong tendency to run-away temperatures and concurrent poor selectivity for the desired primary demethylation reaction.

The foregoing problem has heretofore been recognized in the art. Suggested solutions have included dilution of the charge stock with steam or methane or use of a previously partly deactivated catalyst at high temperatures. Neither of these suggested methods of operation has proved to be entirely satisfactory. Thus, dilution of the charge stock with steam or methane has involved the introduction of a separate diluent component into the reaction mixture while prior partial deactivation of the catalyst has necessitated a careful control over catalyst activity.

Accordingly, it is a primary object of this invention to provide a process for selective demethylation of a mixture of saturated and unsaturated hydrocarbons without encountering the above disadvantages attributable to the formation of "hot spots" in the demethylation catalyst. Another object is the provision of a process for selective demethylation of a mixture of (1) a saturated hydrocarbon including paraffin hydrocarbons having more than 4 carbon atoms per molecule and naphthenic hydrocarbons having alkyl groups containing at least 2 carbon atoms and (2) an unsaturated hydrocarbon including aromatic and olefinic hydrocarbons in the presence of hydrogen, utilizing a nickel or cobalt-containing demethylation catalyst wherein such catalyst is not subjected to excessively high temperatures due to the hydrogenation of unsaturated hydrocarbon components in the hydrocarbon charge. A still further object is to provide a process for effectively selectively demethylating paraffin hydrocarbons having more than 4 carbon atoms per molecule from a mixture of the same with one or more aromatic hydrocarbons in the presence of a nickel or cobalt demethylation catalyst under conditions such that said catalyst is not subjected to the excessively high temperatures heretofore encountered in demethylation treatment of such mixtures.

The above, and other objects which will be apparent to those skilled in the art are achieved by the process of this invention. Broadly stated, the present invention involves bringing a charge mixture of hydrocarbons made up of at least one demethylatable saturated hydrocarbon and at least one unsaturated hydrocarbon, which may or may not be demethylatable, into an initial contact zone in the presence of hydrogen with a platinum metal catalyst under conditions such that hydrogenation of the unsaturated hydrocarbon in the charge mixture takes place without effecting demethylation of the demethylatable hydrocarbons and thereafter bringing the resulting product mixture into a second contact zone with a demethylation cobalt or nickel catalyst under conditions such that selective demethylation of the demethylatable material being conducted to said second contact zone is achieved.

By the term "selective demethylation" is meant the herein described treatment of a demethylatable hydrocarbon i.e. a hydrocarbon having one or more removable methyl groups with hydrogen in the presence of a catalyst of cobalt or nickel under conditions such that certain methyl groups are removed as methane in preference to other groups from the hydrocarbon being subjected to said treatment.

In accordance with the foregoing, the unsaturated hydrocarbons in the charge stock become hydrogenated during contact with the platinum metal catalyst and subsequent contact of the resultant product mixture with the cobalt or nickel demethylation catalyst does not effect an increase in temperature thereof to the extent observed in the absence of preliminary treatment of the charge stock with the platinum metal catalyst. It has been observed in connection with the present invention that the problem of temperature control during demethylation is aggravated by the presence of unsaturates in a hydrocarbon charge stock consisting primarily of saturated hydrocarbons and unsaturated hydrocarbons. Such difficulty in temperature control arises in the heretofore conventional manner of operation because the unsaturated hydrocarbons are hydrogenated over the cobalt or nickel catalyst under the conditions of demethylation. The demethylation reaction must necessarily be carried out in the presence of hydrogen since hydrogen is needed to keep the catalyst active and also hydrogen is consumed in the reaction. Hydrogenation of the unsaturated hydrocarbons in the charge stock is highly exothermic and contributes heat to a catalyst which already has difficulty in dissipating the heat generated during demethylation of the demethylatable components of the reaction mixture.

The process of the present invention accordingly provides a solution to the problem of heat contributed by hydrogenation of the unsaturated hydrocarbon components of the reaction mixture during demethylation. Typical of the hydrocarbon mixtures contemplated for demethylation treatment in accordance with the present invention are those made up of at least one saturated hydrocarbon selected from paraffin hydrocarbons having more than 4 carbon atoms per molecule and naphthenic hydrocarbons having alkyl groups containing at least 2 carbon atoms and at least one unsaturated hydrocarbon selected from olefinic and aromatic hydrocarbons. The latter aromatic hydrocarbon may itself be demethylatable, for example an alkyl aromatic having one or more alkyl groups containing at least 2 carbon atoms, or may not be subject to demethylation, i.e. an unsubstituted aromatic compound. Generally, the charge stocks contemplated for treatment in accordance with the present process are those characterized by a minimum unsaturated hydrocarbon content to produce, during hydrogenation, an amount of heat incapable of being effectively dissipated by the demethylation catalyst during the demethylation reaction. While the lower limit of unsaturated hydrocarbon content in the charge stock will depend in each instance on the reaction conditions and the particular catalyst employed, the stocks undergoing the specified demethylation treatment are generally characterized by a content of at least about 1 percent by weight of unsaturated hydrocarbons. The content of unsaturated hydrocarbons may extend up to 80–90 percent by weight of the charge stock. However, generally the charge mixture will be made up of a major proportion of one or more saturated demethylatable hydrocarbons and a minor proportion of one or more unsaturated hydrocarbons. A representative charge stock, in this regard, is a mixture consisting predominately of paraffinic hydrocarbons together with a minor proportion of aromatic hydrocarbons, for example a petroleum refinery fraction containing $C_6$ hydrocarbons and having an approximate boiling point range of 120 to 160° F.

The invention thus consists of bringing a hydrocarbon charge, of the type indicated, initially into contact with a platinum metal catalyst and thereafter into contact with a demethylation catalyst of cobalt or nickel. Under conditions at which conventional cobalt or nickel demethylation catalysts demethylate mixtures of saturated and unsaturated hydrocarbons of the type indicated, platinum metal catalysts do not degrade such hydrocarbons at all, but under such conditions, platinum metal catalysts do effect hydrogenation of unsaturated hydrocarbons. Thus, the platinum metal catalyst serves to hydrogenate the unsaturated hydrocarbons in the charge in a zone distinct from that wherein demethylation is accomplished. The heat of such hydrogenation is also dissipated in such reaction zone preceding that in which demethylation takes place. The reaction mixture resulting from contact with the platinum metal catalyst and consisting primarily of saturated hydrocarbons then is contacted with the demethylation catalyst of cobalt or nickel. Upon such contact demethylation occurs without any substantial contribution of the heat of hydrogenation of unsaturated hydrocarbons present in the initial hydrocarbon charge thereby eliminating the formation of "hot spots" in the demethylation catalyst and also eliminating consequent side reactions.

The process of this invention is carried out under correlated conditions of temperature and pressure. Operating temperatures employed in the process extend from 350 to 750° F. and preferably from 500° F. to 650° F. Pressures employed extend from 50 to 3000 p.s.i.g. and preferably from 100 to 1000 p.s.i.g. The mol ratio of hydrogen to hydrocarbon, over and above the amount of hydrogen which must be added to saturate all unsaturated hydrocarbons in the charge, is between 1.5 and 40 and preferably between 2 and 10. The liquid hourly space velocity is generally between about 0.5 and about 10.

The particular operating conditions of temperature and pressure utilized in the present process are dependent upon the hydrocarbon mixture being treated, the composition and activity of the catalysts, the ratio of hydrogen to hydrocarbon and other factors. Furthermore, the different hydrocarbons which may be subjected to hydrogenation to split methane therefrom and form substantially saturated hydrocarbons of lower molecular weight are not necessarily equivalent in their behavior under the hereinabove defined conditions of selective demethylation.

The platinum metal catalyst employed in the pretreating zone consists essentially of a porous carrier composited with a small amount of one or more of the platinum metals, i.e., platinum, palladium, rhodium, osmium, iridium and ruthenium. It is contemplated that the carrier employed may be any porous inert material which is not adversely affected by the temperature conditions of the process. The carrier desirably has a surface area greater than about 10 square meters per gram and preferably in excess of 30 square meters per gram and may extend up to 500 square meters per gram or more to achieve efficient surface spreading of the platinum metal. The term "surface area" as used herein designates the surface area of the carrier as determined by the adsorption of nitrogen according to the method of Brunnauer et al., Journal American Chemical Society, 60, 309 et seq. (1938). The carrier is inert, that is, it is devoid of or exerts negligible catalytic activity under the reaction conditions at which the present process is carried out. Suitable carriers include oxides of the metals of group IIA, IIIB, IVA, and IVB of the periodic table. Non-limiting examples thereof include alumina, zirconia, titania, silica, magnesia, etc. Other suitable inert materials include charcoal, kieselguhr, porous glass, porcelain, pumice, coke, activated carbon, bauxite, etc. The porous inert carrier serves as a support for a catalytically effective amount of a platinum metal, i.e. platinum, palladium, rhodium, osmium, iridium, and ruthenium, as well as alloys or mixtures of these metals. Of the foregoing, platinum and palladium, and in particular platinum, are accorded preference. The amount of the platinum metal contained in the instant catalyst is generally between about 0.05 and about 10 percent by weight and more particularly between about 0.1 and about 5 percent by weight of the catalyst.

The platinum metal may be deposited on the carrier in any suitable manner. One feasible method is to mix particles of the carrier with an aqueous solution of an acid of the metal, for example, chloroplatinic or chloropalladic acid or of the ammonium salt of the acid, of suitable concentration. The impregnated particles are then dried and treated with hydrogen at elevated temperatures to reduce the chloride to the metal and to activate the catalyst.

Commercially available platinum metal reforming catalysts have been found to be effective as pretreating catalysts in the present process. These catalysts generally consist of platinum impregnated on an alumina support, which alumina has been combined or composited with a small amount, generally between about 0.1 percent and about 10 percent by weight of an acidic promoter such as halogen, boria, silica and the like. Typical of such catalytic composites is a catalyst of alumina containing between about 0.1 and about 8 percent by weight of chlorine or fluorine impregnated with between about 0.05 and about 10 percent by weight of platinum.

The activity and amount of the platinum metal catalyst employed herein should essentially be sufficient to effect hydrogenation of the unsaturated hydrocarbon component of the charge mixture and to dissipate the heat of such hydrogenation. The activity and amount of the platinum metal catalyst can be controlled by the proportion of platinum metal composited with the carrier. In this regard, generally the smaller the quantity of platinum metal present, the lower is the hydrogenation activity of the catalyst. The amount of surface available for distribution of the heat of hydrogenation can be suitably supplemented by admixture of the platinum metal catalyst with a catalytically inert material such as silica, alumina, kieselguhr or other inerts effective in dissipation of the generated heat. In this manner, the platinum metal catalyst is conserved since only sufficient of this catalyst to afford the necessary hydrogenation activity need be present and the inert diluent material may be used as the principal heat transfer medium. Alternatively, a platinum metal catalyst of requisite concentration may be used in an amount sufficient to effectively dissipate the heat of hydrogenation. Generally, the activity and amount of platinum metal catalyst employed is such that the dehydrogenation activity (DA) attributable to such catalyst is at least about 5000 and more usually within the range of 10,000 to 200,000. In evaluating dehydrogenation activity, a small amount of catalyst sample, for example, 0.01 ml. in the form of 100–150 mesh powder is introduced into a reactor tube. The catalyst sample is treated with hydrogen for ½ hour. Cyclohexane and hydrogen in a molar ratio of 1:4 and at a pressure of 350 pounds per square inch gauge are then passed over the catalyst at a liquid hourly space velocity of 5000 ml./ml./hr. The catalyst temperature is maintained at 750° F. After a ½ hour run, the product is collected, condensed and analyzed for benzene by mass spectrometer and from its concentration the rate of formation of benzene expressed in moles per second per gram of metal (platinum) $\times 10^6$ in the catalyst is calculated. This number is designated as the dehydrogenation activity or DA index.

The demethylation catalyst used in the process of this invention comprises nickel or cobalt and their oxides, either used as such or supported by carriers such as diatomaceous earth or kieselguhr, alumina, silica and combinations thereof, crushed porcelain or other refractory materials having substantially no adverse effect on the demethylation reaction.

A highly active nickel catalyst employed in the present demethylation process contains approximately 45% by weight of nickel, deposited on kieselguhr. This catalyst may be made by the general steps of suspending kieselguhr in a dilute solution of nickel sulfate and gradually adding thereto, an excess of a hot saturated solution of sodium carbonate. The mixture of nickel sulfate solution and kieselguhr is agitated vigorously while sodium carbonate solution is introduced thereto to form a precipitate which is then removed from the solution by filtration and then washed, dried and reduced with hydrogen. Other nickel catalysts may also be prepared from different proportions of the nickel compound and carrier.

Cobalt catalysts may be produced by the same series of steps as used in producing nickel kieselguhr catalyst composites. Kieselguhr and cobalt nitrate are mixed with water and then treated with an excess of a hot saturated solution of sodium carbonate. The mixture of cobalt nitrate solution and kieselguhr suspended therein is agitated vigorously while the sodium carbonate solution is added thereto to form a precipitate which is then removed by filtration and washed, dried and reduced to give an active cobalt-kieselguhr catalyst utilizable in the form of powder or pellets in essentially the same manner as the nickel-kieselguhr catalyst.

Nickel or cobalt may likewise be deposited on or composited with synthetic inorganic gels by well known techniques. Thus, such metal may be composited by impregnation on a synthetic silica-alumina gel containing approximately 90% by weight silica and 10% by weight alumina. Preparation of silica-alumina composites suitably employed as carriers for nickel or cobalt may be effected by intimately admixing an acidic solution of an aluminum salt with sodium silicate to yield a silica-alumina hydrosol which sets after lapse of a suitable period of time, to a hydrogel. The resulting hydrogel is thereafter water washed, base exchanged to remove zeolitic sodium, dried, preferably in superheated steam and finally calcined at 900° F. to 1400° F. in air. Alternately a silica-alumina composite may be produced by separately forming a hydrogel or gelatinous precipitate of silica and a hydrogel or gelatinous precipitate of alumina and ball milling or otherwise intimately admixing the silica and alumina together to yield a silica-alumina composite. In such instances the silica is suitably prepared by mixing an acid solution for example, aqueous sulfuric acid solution with sodium silicate. If it is desired to prepare silica initially free of alkali metal ions, such may be accomplished by effecting hydrolysis of alkyl silicates, i.e., ethyl silicate. Alumina is readily prepared by the addition of ammonium or alkali metal hydroxide to an aqueous aluminum salt solution, for example, an aluminum salt of a mineral acid, such as aluminum nitrate, aluminum chloride or aluminum sulfate. As another alternative procedure for preparing the silica-alumina composite, a synthetic silica gel or precipitate may be prepared in accordance with one of the foregoing processes and alumina may be deposited thereon by contacting the silica gel or precipitate with an aqueous aluminum salt solution, followed by the addition of a sufficient amount of ammonium hydroxide to effect precipitation of alumina on the silica. The composite of silica and alumina can further be prepared by contacting a preformed silica gel with an aqueous aluminum salt solution, thereafter removing the impregnated silica gel from the solution and heating to a sufficiently elevated temperature to decompose the aluminum salt laid down by impregnation to alumina, so that the resulting product is silica impregnated with alumina. All of the foregoing methods for preparing composites of silica and alumina are well known in the art and are referred to herein merely as illustrative of suitable preparation procedures. It is also feasible to produce the silica-alumina composite in the form of spheroidal particles such as beads, following the teachings of Marisic set forth in U.S. 2,384,946, or in the form of uniformly shaped pellets prepared by casting or extrusion methods. The silica-alumina carrier may also be prepared as a mass which is thereafter broken up into irregularly shaped pieces.

The particular carrier employed has deposited thereon a sufficient amount of nickel or cobalt to impart to the composite requisite demethylation activity. The amount of nickel or cobalt used will depend on the charge stock, the specific metal utilized as well as on the other conditions under which the demethylation is accomplished. Thus, the amount of nickel or cobalt present in the catalyst utilized in the demethylation zone of the present process may vary over wide limits, i.e. extending from about 1 percent by weight of the metal on an inert carrier up to 100 percent of such metal in an unsupported state.

In all of the foregoing procedures, the resultant metal of nickel or cobalt deposited on a carrier, for example, kieselguhr or a silica-alumina composite, is employed in finely divided form when demethylation is effected in batch-type treatment or in fluidized or fluidized fixed bed-type of operation. When pelleted or formed catalyst particles are desired, the finely divided mixture preferably before being subjected to reduction with hydrogen is mixed with graphite or some other lubricant and formed into pellets.

As in the case of the platinum metal pretreater catalyst, it is quite feasible and may in some instances be desirable to admix the demethylation catalyst of nickel or cobalt with a catalytically inert material such as silica, alumina, kieselguhr or other material effective in dissipation of the heat generated in the demethylation zone. The activity and amount of nickel or cobalt demethylation catalyst is generally such that the dehydrogenation activity (DA) as defined hereinabove based on the metal content of such catalyst is at a minimum of about 200 and a maximum not exceeding the aforementioned minimum dehydrogenation activity of the platinum metal catalyst, i.e. about 5000.

Operation may be carried out on a batch basis or in a continuous manner. Batch-type treatment of the hydrocarbon charge may be effected in reactors or autoclaves of suitable design in which the hydrocarbon charge and catalyst are treated with hydrogen under the desired conditions of operation and for a time sufficient to effect preliminary hydrogenation of unsaturated components of the charge and subsequent removal of one or more methyl groups, which removal is accompanied by addition of hydrogen so as to produce methane and a saturated hydrocarbon product, for example, a paraffin containing fewer carbon atoms than those present in the hydrocarbon mixture charged to the process.

The selective demethylation process of this invention may be operated continuously in a single suitable chamber or reactor containing a fixed bed or layer of the nickel or cobalt demethylation catalyst with an overlying layer or bed of the platinum metal catalyst and through which the hydrocarbon charge stock and hydrogen gas are passed under selected conditions of temperature and pressure. Under such conditions of operation, the reaction products are discharged continuously from the reactor at substantially the same rate as that which they are charged thereto. The products of demethylation are fractionated by suitable means to separate the desired demethylated hydrocarbons from the unconverted portion of the hydrocarbon material charged to the process and said unconverted material is recycled in admixture with the hydrocarbon material charged.

Also, the process may be carried out continuously, utilizing separate reactors or chambers for the nickel or cobalt demethylation catalyst and the platinum metal pretreater catalyst employing either catalyst in the form of a static particle-form bed or in the form of powdered catalyst utilizing the fluid or fluidized fixed-bed type of operation. For example, a hydrocarbon charge and hydrogen are pre-heated to a chosen reaction temperature in the range of 350–750° F. and the resultant mixture of gas and hydrocarbon vapor is charged to a reaction zone containing the pretreater platinum metal catalyst and thereafter to a separate zone containing the demethylation catalyst. The effluent hydrocarbon vapors and gases are directed from the reaction zone to a catalyst separating zone, assuming fluidized catalyst was employed, such as a cyclone separator in order to substantially remove therefrom the finely powdered catalyst which is then returned to the reactor. The mixture of hydrocarbon vapors and gas so freed from finely divided catalyst is then directed to a second separating zone in which the gases are separated from the liquid hydrocarbons. Fractional distillation methods are employed for separating gaseous products and desired demethylated products from unconverted hydrocarbon charging stock which is recycled to further treatment in the presence of hydrogen.

It is apparent from the foregoing that as a reaction mixture of hydrocarbons and hydrogen proceeds through the reaction zone containing the demethylation catalyst, hydrogen is consumed continuously to form methane and consequently the partial pressure of hydrogen decreases continuously as the reaction mixture approaches the exit end of the reaction zone.

Calculations have established that when one methyl group is removed as methane from one gram mole of a paraffin hydrocarbon approximately 12,500 calories of heat are evolved. In the hydrogenation of an olefin, the evolution of about 16,900 calories accompanies the hydrogenation of one double bond per mole of hydrocarbon. The hydrogenation of an aromatic, i.e. benzene to cyclohexane, on the other hand involves the evolution of about 51,900 calories. It is evident that the heat of hydrogenation, per unit conversion, is greater than the heat of demethylation. In accordance with the process of the present invention, the heat of hydrogenation is dissipated in a separate pretreating zone wherein demethylation does not occur in the presence of the platinum metal catalyst, so that the only reaction heat to which the demethylation catalyst is subsequently exposed is the heat of demethylation.

It has also been found that the manner in which the demethylation catalyst was reduced had an important influence upon its activity and performance in the demethylation process. While nickel or cobalt catalysts which have been reduced at a temperature of 700° F. may be employed in the present demethylation process, it is preferred to utilize catalysts which have been initially reduced with hydrogen and then heated further in hydrogen at a temperature of from about 800 to about 1200° F. prior to use in demethylation. After this treatment with hydrogen, the catalyst was of such activity that the demethylation reaction carried out in its presence could be controlled readily at relatively high conversions per pass, although it is preferred to operate so as to obtain from about 20 to about 50% conversion per pass and to recycle unconverted charge stock. If the catalyst was not given the pretreatment with hydrogen at about 800 to about 1200° F., its initial activity was often so high that the exothermic heat arising from demethylation caused an excessive temperature which not only had a tendency to deactivate the catalyst but also to cause excessive conversion of the charged hydrocarbon into methane and to generate more exothermic heat of reaction. However, when the activity of the catalyst was modified by the reducing pretreatment, the demethylation reaction could be controlled and could be substantially stopped after only one or two methyl groups had been removed from the hydrocarbon charged to the process. Under these circumstances, the heat of reaction was sufficiently low that it could be dissipated from the reaction zone readily enough to maintain a desired catalyst temperature so that relatively high conversions to lower molecular weight hydrocarbons could be attained and so that these conversions could be maintained for relatively long periods of time. In similar manner, it is generally desirable to reduce the platinum metal pretreating catalyst with hydrogen at about 800 to about 1200° F. prior to contacting the same with the hydrocarbon charge.

The following comparative examples will serve to illustrate the process of the invention without limiting the same:

High pressure units were operated at a liquid hourly space velocity of 2, a molar hydrogen to hydrocarbon ratio of 10, and at a pressure of 500 p.s.i.g. Forty cubic centimeters (40 cc.) of 14 to 25 mesh nickel demethylation catalyst was employed. When an overlying layer of platinum pretreating catalyst was used, its volume was 20 cc. so that total catalyst volume was 60 cc. The charge rate was the same in runs with and without the platinum catalyst pretreater.

The hydrocarbon charge stock employed was a 120 to 160° F. $C_6$ cut from 98 octane (F–1+3 cc. TEL) Mid-Continent reformate having the following composition:

| | Weight percent |
|---|---|
| Propane | 0.1 |
| i-Butane | 0.1 |
| i-Pentane | 1.3 |
| n-Pentane | 3.1 |
| n-Hexane | 25.6 |
| 2-methylpentane | 23.7 |
| 3-methylpentane | 17.4 |
| 2,2-dimethylbutane | 2.9 |
| 2,3-dimethylbutane | 4.0 |
| 2,2-dimethylpentane | 2.6 |
| Cyclopentane | 1.0 |
| Methylcyclopentane | 7.5 |
| Cyclohexane | 0.2 |
| Benzene | 10.5 |
| | 100.0 |

Hydrogen was passed over each catalyst in place in the unit for 10 to 14 hours at 950° F. before hydrocarbon flow was initiated. Then the unit was run for about 2 hours at the lowest temperature to be used in the test, after which a 30 to 60 minute run was made for a material balance. The temperature was then raised to the next desired level. When it was stabilized at the new temperature, usually in about 1 hour, another material balance was made. In this way, the performance of the catalyst was measured at a sequence of increasing temperatures.

The following catalysts were employed:

| Catalyst Designation | Catalyst Description |
| --- | --- |
| Catalyst A | 45.5% Ni on kieselguhr; S.A. (surface area)=90-120 m.²/gm. |
| Catalyst B | 4.6% Ni on 430 m.²/gm. Silica-alumina cogel (90% $SiO_2$—10% $Al_2O_3$); S.A.=381 m.²/gm. |
| Catalyst C | 0.58% Pt on alumina; 0.67% Cl; S.A.=450 m.²/gm. |

Comparison of the use of a bed 40 cc. of nickel on kieselguhr catalyst alone with the use of 20 cc. of an overlying bed of platinum on alumina catalyst plus 40 cc. of nickel on kieselguhr is shown in Figure 1 of the accompanying drawing, and in Table I set forth below:

TABLE I

*Demethylation of 120–160° F. cut from 98 O.N. Mid-Continent reformate nickel/kieselguhr with and without platinum/alumina pretreater*

[$H_2$/HC=10 mol/mol. Pressure=500 p.s.i.g. LHSV=2.0]

| Run No. | Catalyst Designation | Avg. Catalyst Temp., °F. | Products (gm./100 gm. charge) | | | | | Ultimate Yield of Pentanes (Wt. Percent on Charge) |
| --- | --- | --- | --- | --- | --- | --- | --- | --- |
| | | | $C_1$ | $C_2+C_3$ | $C_4$ | $C_5$ | $C_6+$ | |
| 1 | Catalyst A (40 cc.) | 518 | 1.4 | 0.5 | 0.4 | 10.4 | 87.0 | 69 |
| 2 | do | 528 | 2.2 | 0.6 | 2.2 | 15.2 | 80.9 | 74 |
| 3 | do | 527 | 2.6 | 0.8 | 1.1 | 14.2 | 81.7 | 71 |
| 4 | do | 546 | 5.2 | 0.9 | 3.3 | 20.6 | 71.5 | 68 |
| 5 | do | 553 | 6.7 | 1.3 | 3.7 | 18.9 | 70.5 | 59 |
| 6 | do | 558 | 9.7 | 0.9 | 5.8 | 30.1 | 55.6 | 65 |
| 7 | do | 567 | 11.1 | 2.9 | 6.7 | 31.2 | 52.2 | 63 |
| 8 | do | 560 | 8.3 | 1.5 | 4.8 | 26.7 | 60.9 | 65 |
| 9 | Catalyst A (40 cc.)+Catalyst C (20 cc.) | 511 | 1.2 | 0.1 | 0.5 | 10.3 | 88.4 | 82 |
| 10 | do | 524 | 2.4 | 0.1 | 0.9 | 14.4 | 84.5 | 91 |
| 11 | do | 536 | 3.6 | 0.4 | 1.7 | 18.9 | 78.4 | 85 |
| 12 | do | 557 | 7.0 | 1.0 | 5.6 | 32.7 | 57.5 | 75 |
| 13 | do | 534 | 1.9 | | 0.4 | 12.0 | 88.3 | 107 |
| 14 | do | 563 | 5.9 | 0.5 | 2.5 | 25.0 | 68.3 | 76 |
| 15 | do | 579 | 15.1 | 1.6 | 8.6 | 34.5 | 43.0 | 62 |

Figure 2:
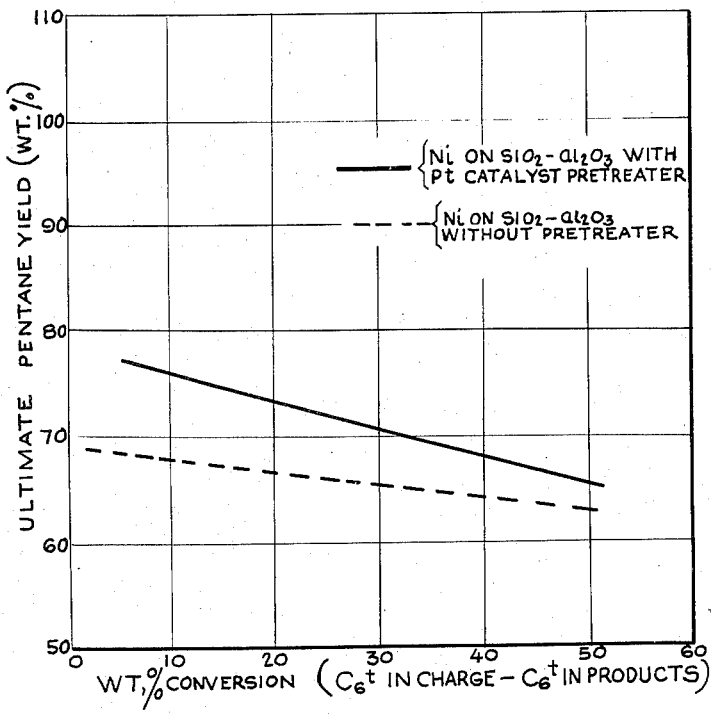

Comparison of the use of a bed of 40 cc. of nickel on silica-alumina cogel catalyst alone with the use of 20 cc. of an overlying bed of platinum on alumina catalyst plus 40 cc. of nickel on silica-alumina is shown in Figure 2 of the accompanying drawing and in Table II set forth below:

TABLE II

*Demethylation of 120–160° F. cut from 98 O.N. Mid-Continent reformate nickel/silica/alumina with and without platinum/alumina pretreater*

[$H_2$/HC=10 mol/mol. Pressure=500 p.s.i.g. LHSV=2.0]

| Run No. | Catalyst Designation | Avg. Catalyst Temp., °F. | Products (gm./100 gm. charge) | | | | | Ult. Yield of Pentanes (Wt. Percent on Charge) |
| --- | --- | --- | --- | --- | --- | --- | --- | --- |
| | | | $C_1$ | $C_2+C_3$ | $C_4$ | $C_5$ | $C_6+$ | |
| 16 | Catalyst B (40 cc.) | 512 | | | 0.1 | 5.4 | 98.3 | |
| 17 | do | 520 | 0.1 | | 0.2 | 5.1 | 96.8 | |
| 18 | do | 539 | 0.1 | | 0.1 | 5.7 | 97.2 | |
| 19 | do | 552 | 0.1 | | 0.3 | 9.2 | 92.7 | |
| 20 | do | 610 | 0.1 | 0.1 | 0.3 | 5.5 | 96.9 | |
| 21 | do | 643 | 0.2 | 0.1 | 0.4 | 3.8 | 98.2 | |
| 22 | do | 706 | 7.3 | 1.7 | 3.8 | 21.8 | 69.0 | 66 |
| 23 | do | 656 | 0.8 | 0.5 | 0.5 | 7.0 | 93.4 | |
| 24 | Catalyst B (40 cc.)+Catalyst C (20 cc.) | 607 | 0.4 | 0.2 | 0.4 | 6.4 | 94.7 | |
| 25 | do | 663 | 2.5 | 0.8 | 1.4 | 12.7 | 84.4 | 74 |
| 26 | do | 690 | 4.3 | 2.1 | 4.5 | 25.2 | 65.7 | 71 |
| 27 | do | 671 | 3.4 | 0.9 | 2.3 | 16.8 | 79.2 | 76 |
| 28 | do | 622 | 0.4 | 0.3 | 0.6 | 6.2 | 94.1 | |
| 29 | do | 472 | | | | 0.2 | 5.2 | 97.0 | |

The comparative data obtained in each instance show higher ultimate yields of pentanes from $C_6$ hydrocarbons when the platinum on alumina pretreat section was used. Accordingly, a definitely more selective demethylation was achieved by bringing the hydrocarbon charge initially into contact with the platinum catalyst and thereafter into contact with the nickel catalyst than was obtained in the absence of pretreatment of the charge with the platinum catalyst.

It is accordingly to be understood that the above description is merely illustrative of preferred embodiments of the invention; of which many variations may be made within the scope of the following claims by those skilled in the art without departing from the spirit thereof.

I claim:

1. A hydrocarbon conversion process which comprises reacting hydrogen with a sulfur-free hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one aromatic hydrocarbon at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of a platinum metal and thereafter in a second contact zone in the presence of a catalyst selected from the group consisting essentially of nickel deposited on an inert support and cobalt deposited on an inert support, whereby hydrogenation of the aromatic hydrocarbon component of said mixture is effected and the heat of said hydrogenation is dissipated in said initial contact zone and selective removal of at least one methyl group from the saturated hydrocarbon component of the effluent from the initial contact zone is effected and the heat generated by said removal is dissipated in said second contact zone.

2. A process for effecting demethylation of a sulfur-free hydrocarbon mixture consisting essentially of at least one demethylatable saturated hydrocarbon and at least one unsaturated hydrocarbon which comprises contacting said mixture with hydrogen at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of a platinum metal wherein hydrogenation of the unsaturated hydrocarbon component of said mixture is effected without effecting demethylation of the demethylatable saturated hydrocarbon component of said mixture and thereafter conducting the reaction product mixture to a second contact zone wherein selective demethylation of the demethylatable material contained in said mixture is effected in the presence of a catalyst selected from the group consisting essentially of nickel deposited on an inert support and cobalt deposited on an inert support.

3. A hydrocarbon conversion process which comprises reacting hydrogen with a sulfur-free hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one aromatic hydrocarbon at a temperature in the approximate range of 500 to 650° F., a pressure between about 100 and about 1000 pounds per square inch gauge, a liquid hourly space velocity between about 0.5 and about 10, employing a hydrogen to hydrocarbon mole ratio of between about 2 and about 10 in an initial contact zone in the presence of a catalyst of a platinum metal and thereafter in a second contact zone in the presence of a catalyst selected from the group consisting essentially of nickel deposited on an inert support and cobalt deposited on an inert support, whereby hydrogenation of the aromatic hydrocarbon component of said mixture is effected and the heat of said hydrogenation is dissipated in said initial contact zone and selective removal of at least one methyl group from the saturated hydrocarbon component of the effluent from the initial contact zone is effected and the heat generated by said removal is dissipated in said second contact zone.

4. A process for effecting demethylation of a sulfur-free hydrocarbon mixture consisting essentially of at least one demethylatable saturated hydrocarbon and at least one unsaturated hydrocarbon which comprises contacting said mixture with hydrogen at a temperature in the approximate range of 500 to 650° F., a pressure between about 100 and about 1000 pounds per square inch gauge, a liquid hourly space velocity between about 0.5 and about 10, employing a hydrogen to hydrocarbon mole ratio of between about 2 and about 10 in an initial contact zone in the presence of a catalyst of a platinum metal wherein hydrogenation of the unsaturated hydrocarbon component of said mixture is effected without effecting demethylation of the demethylatable saturated hydrocarbon component of said mixture and thereafter conducting the reaction product mixture to a second contact zone wherein selective demethylation of the demethylatable material contained in said mixture is effected in the presence of a catalyst selected from the group consisting essentially of nickel deposited on an inert support and cobalt deposited on an inert support.

5. A hydrocarbon conversion process which comprises reacting hydrogen with a sulfur-free hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one aromatic hydrocarbon at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of platinum deposited on a support, conducting the reaction product mixture from said initial contact zone to a second contact zone in the presence of a catalyst consisting essentially of nickel deposited on a support, whereby hydrogenation of the aromatic hydrocarbon component of said mixture is effected and the heat generated by said hydrogenation is dissipated in said initial contact zone and selective removal of at least one methyl group from the saturated hydrocarbon component of the effluent from the initial contact zone is effected and the heat generated by said removal is dissipated in said second contact zone.

6. A hydrocarbon conversion process which comprises reacting hydrogen with a sulfur-free hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one aromatic hydrocarbon at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of platinum deposited on alumina, conducting the reaction product mixture from said initial contact zone to a second contact zone in the presence of a catalyst consisting essentially of nickel deposited on kieselguhr, whereby hydrogenation of the aromatic hydrocarbon component of said mixture is effected and the heat generated by said hydrogenation is dissipated in said initial contact zone and selective removal of at least one methyl group from the saturated hydrocarbon component of the effluent from the initial contact zone is effected and the heat generated by said removal is dissipated in said second contact zone.

7. A hydrocarbon conversion process which comprises reacting hydrogen with a sulfur-free hydrocarbon mixture consisting essentially of (1) at least one saturated hydrocarbon selected from paraffin hydrocarbons having more than 4 carbon atoms per molecule and naphthenic hydrocarbons having alkyl groups containing at least 2 carbon atoms and (2) at least one aromatic hydrocarbon at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of platinum deposited on alumina, conducting the reaction product mixture from said initial contact zone to a second contact zone in the presence of a catalyst consisting essentially of nickel deposited on a silica-alumina composite, whereby hydrogenation of the aromatic hydrocarbon component of said mixture is effected and the heat generated by said hydrogenation is dissipated in said initial contact zone and selective removal of at least one methyl group from the saturated hydrocarbon component of the effluent from the initial contact zone is effected and the heat generated by said removal is dissipated in said second contact zone.

8. A process for effecting demethylation of a sulfur-free hydrocarbon mixture consisting essentially of at least one paraffin hydrocarbon having more than 4 carbon atoms per molecule and an aromatic hydrocarbon which comprises contacting said mixture in the presence of hydrogen utilizing a hydrogen to hydrocarbon mole ratio of between about 2 and about 10 at a temperature in the approximate range of 500 to 650° F., a pressure between about 100 and about 1000 pounds per square inch gauge and a liquid hourly space velocity between about 0.5 and about 10 in an initial contact zone in the presence of a catalyst of platinum deposited on a support and thereafter in a second contact zone in the presence of a catalyst consisting essentially of nickel deposited on a support whereby hydrogenation of said aromatic hydrocarbon is effected and the heat of said hydrogenation is dissipated in said initial contact zone and selective removal of at least one methyl group from said paraffin hydrocarbon is effected and the heat generated by said removal is dissipated in said second contact zone.

9. A hydrocarbon conversion process which comprises reacting hydrogen with a sulfur-free petroleum refinery fraction having as its major component a mixture of unsaturated and saturated $C_6$ hydrocarbons at a temperature in the approximate range of 350 to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst bed of platinum on a support characterized by a minimum dehydrogenation activity of about 5000 and thereafter in a second contact zone in the presence of a catalyst bed consisting essentially of nickel deposited on a support characterized by a minimum dehydrogenation activity of about 200 and a maximum dehydrogenation activity not in excess of the aforementioned minimum dehydrogenation activity of said platinum catalyst bed, whereby hydrogenation of unsaturated hydrocarbon component is effected and the heat of said hydrogenation is dissipated in said initial contact zone and selective removal of at least one methyl group from the saturated hydrocarbon component is effected and the heat generated by said removal is dissipated in said second contact zone.

10. A hydrocarbon conversion process which comprises reacting hydrogen with a sulfur-free petroleum refinery fraction containing aromatic and paraffin $C_6$ hydrocarbons and having an approximate boiling point range of 120 to 160° F. at a temperature in the approximate range of 350° F. to 750° F., a pressure between about 50 and about 3000 pounds per square inch gauge, a liquid hourly space velocity between about 0.5 and about 10, employing a hydrogen to hydrocarbon mole ratio of between about 1.5 and about 40 in an initial contact zone in the presence of a catalyst of platinum deposited on a support and thereafter in a second contact zone in the presence of a catalyst consisting essentially of nickel deposited on a support whereby hydrogenation of said aromatic hydrocarbon is effected and the heat of said hydrogenation is dissipated in said initial contact zone and selective removal of at least one methyl group from said paraffin hydrocarbon is effected and the heat generated by said removal is dissipated in said second contact zone.

References Cited in the file of this patent

UNITED STATES PATENTS

| | | |
|---|---|---|
| 2,428,692 | Voorhies | Oct. 7, 1947 |
| 2,717,230 | Murray et al. | Sept. 6, 1955 |
| 2,739,927 | Doumani | Mar. 27, 1956 |
| 2,770,578 | Haensel | Nov. 13, 1956 |
| 2,810,004 | Morebeck et al. | Oct. 15, 1957 |
| 2,906,784 | Dean et al. | Sept. 29, 1959 |